United States Patent
Miyamori et al.

(10) Patent No.: US 8,576,290 B2
(45) Date of Patent: Nov. 5, 2013

(54) ACTUATOR, DRIVING DEVICE AND IMAGING DEVICE

(75) Inventors: Kenichi Miyamori, Hyogo (JP); Makoto Umeda, Osaka (JP)

(73) Assignee: Panasonic Corporation, Osaka (JP)

( * ) Notice: Subject to any disclaimer, the term of this patent is extended or adjusted under 35 U.S.C. 154(b) by 411 days.

(21) Appl. No.: 13/023,493

(22) Filed: Feb. 8, 2011

(65) Prior Publication Data

US 2012/0133818 A1 May 31, 2012

(30) Foreign Application Priority Data

Nov. 30, 2010 (JP) .................................. 2010-266827

(51) Int. Cl.
H04N 5/228 (2006.01)
G03B 13/00 (2006.01)

(52) U.S. Cl.
USPC ..................................... 348/208.99; 348/345

(58) Field of Classification Search
USPC ......... 348/207.99, 373–37, 208.99, 335, 345, 348/373–376; 396/55
See application file for complete search history.

(56) References Cited

U.S. PATENT DOCUMENTS

| | | | | |
|---|---|---|---|---|
| 6,631,042 B2* | 10/2003 | Noguchi | ....................... | 359/823 |
| 8,049,782 B2* | 11/2011 | Noji | ........................... | 348/208.2 |
| 2007/0047147 A1 | 3/2007 | Kuo | | |
| 2007/0183766 A1 | 8/2007 | Miyamori et al. | | |
| 2009/0128928 A1* | 5/2009 | Ito | ................................. | 359/814 |
| 2011/0044672 A1* | 2/2011 | Ito | ................................. | 396/55 |

FOREIGN PATENT DOCUMENTS

| | | |
|---|---|---|
| JP | 2007-066499 A | 3/2007 |
| JP | 2007-241254 A | 9/2007 |

* cited by examiner

*Primary Examiner* — James Hannett
*Assistant Examiner* — Ahmed A Berhan
(74) *Attorney, Agent, or Firm* — Shinjyu Global IP

(57) ABSTRACT

The actuator disclosed herein comprises a coil, a magnet and a magnetism detection element. The magnet is configured to move a predetermined distance relative to the coil via a magnetic force generated when current is passed through the coil. The magnet includes a first polarization line perpendicular to the direction in which the magnet moves relative to the coil, and a second polarization line parallel to the first polarization line. The magnetism detection element is configured to detect the position of the magnet. The coil faces the first polarization line and the magnetism detection element faces the second polarization line. The length from the second polarization line to a first end of the magnet is equal to or more than 1.25 times the predetermined distance. The first end of the magnet is closer to the magnetism detection element than to the coil.

15 Claims, 14 Drawing Sheets

ACTUATOR, DRIVING DEVICE AND IMAGING DEVICE

CROSS-REFERENCE TO RELATED APPLICATIONS

This application claims priority under 35 U.S.C. §119 to Japanese Patent Application No. 2010-266827, filed on Nov. 30, 2010. The entire disclosure of Japanese Patent Application No. 2010-266827 is hereby incorporated herein by reference.

BACKGROUND

1. Technical Field

The technology disclosed herein relates to an actuator and to a drive device and an imaging device including this actuator.

2. Background Information

One electromagnetic actuator that has been often used in the past in imaging devices and so forth, which is disclosed in Patent Literature 1 (Japanese Laid-Open Patent Application 2007-241254), has a magnet, a coil that faces this magnet and moves the magnet with magnetic force generated when current is passed through the coil, and a magnetism detection element that faces the magnet and detects the position of the magnet.

Meanwhile, the electromagnetic actuator disclosed in Patent Literature 2 (Japanese Laid-Open Patent Application 2007-66499) has a magnet that is magnetized so that three or more magnetic poles are aligned.

There needs to be a certain amount of latitude in an electromagnetic actuator in relation to the layout of the coil and the magnetism detection element with respect to the magnet in order to satisfy various restrictions in terms of designing the drive device and imaging device in which the electromagnetic actuator will be housed. In view of this, making use of a magnet that is magnetized with an arrangement of three or more magnetic poles, as in Patent Literature 2, is one possible way to increase this latitude.

SUMMARY

One object of the technology disclosed herein is to improve the drive performance of an actuator having a magnet that is magnetized with an arrangement of three or more magnetic poles and to provide a drive device and an imaging device that includes the actuator.

In accordance with one aspect of the technology disclosed herein, an actuator is provided that comprises a coil, a magnet and a magnetism detection element. The magnet is configured to move a predetermined distance relative to the coil via a magnetic force generated when current is passed through the coil. The magnet includes a first polarization line perpendicular to the direction in which the magnet moves relative to the coil, and a second polarization line parallel to the first polarization line. The magnetism detection element is configured to detect the position of the magnet. The coil faces the first polarization line and the magnetism detection element faces the second polarization line. The length from the second polarization line to a first end of the magnet is equal to or more than 1.25 times the predetermined amount. The first end is closer to the magnetism detection element than to the coil.

These and other objects, features, aspects and advantages of the technology disclosed herein will become apparent to those skilled in the art from the following detailed description, which, taken in conjunction with the annexed drawings, discloses embodiments of the present invention.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

1: Overview of Digital Camera

Figure 1:
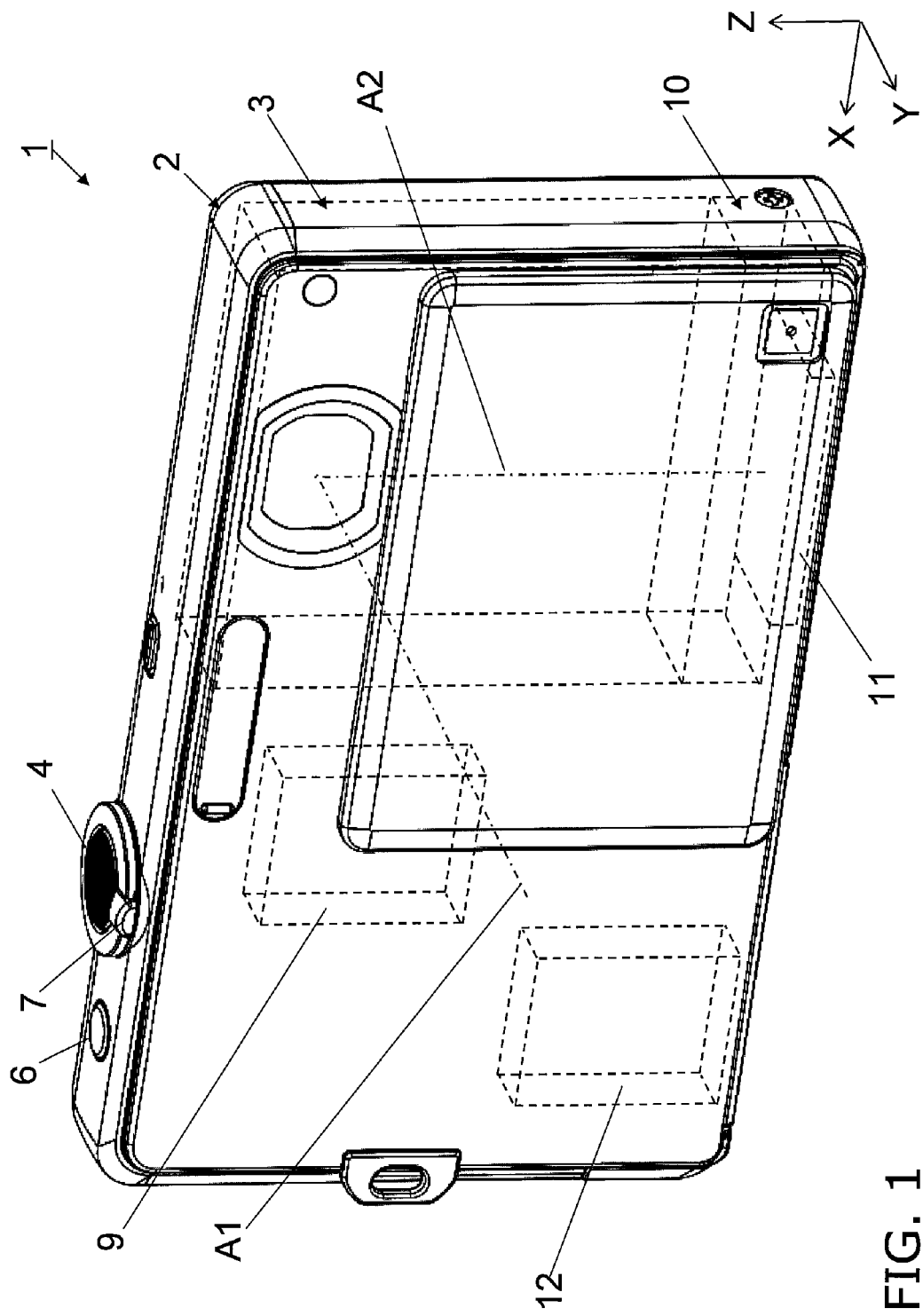
FIG. 1 is a simplified oblique view of a digital camera as seen from its front pertaining to an embodiment of the present invention.
Figure 2:
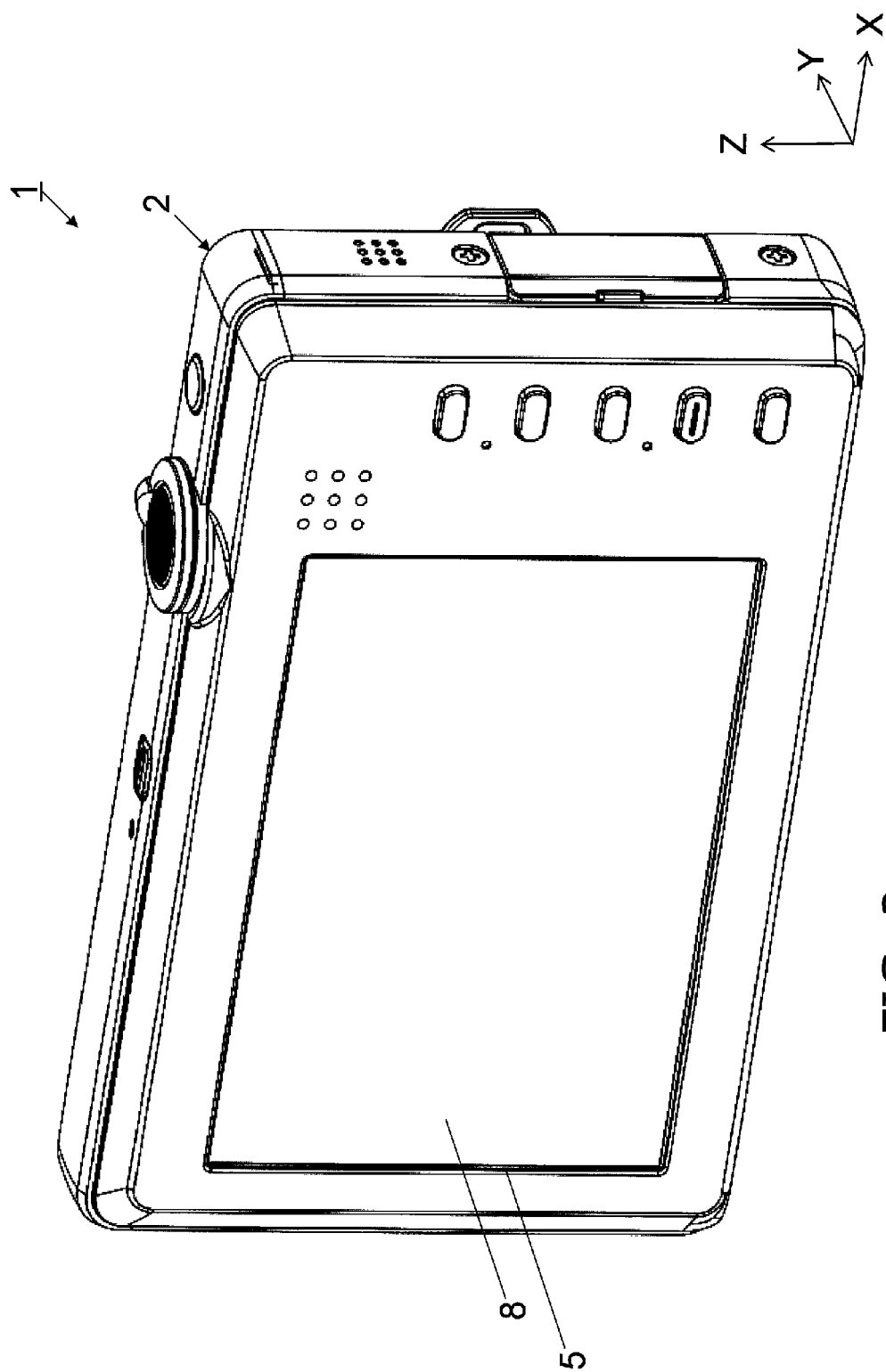
FIG. 2 is a simplified oblique view of the digital camera as seen from its rear.

A digital camera 1 will be described through reference to FIGS. 1 and 2 as an example of an imaging device pertaining to an embodiment of the present invention. FIGS. 1 and 2 are simplified oblique views of the digital camera 1.

The digital camera 1 is a camera for acquiring an image of a subject, and has a substantially rectangular camera housing 2 that defines the outer shape of the digital camera 1. A lens barrel 3 that supports a bending imaging optical system O is installed in the interior of the camera housing 2 to afford a higher zoom ratio and achieve a compact size (and particularly to reduce the thickness).

In the following description, the six sides of the digital camera 1 are defined as follows.

The side facing the subject when an image is being captured by the digital camera 1 is called the front face, and the face on the opposite side is called the rear face. When an image is captured such that up and down in the vertical direction of the subject coincide with up and down in the short-side direction of the rectangular image being captured by the digital camera 1 (the aspect ratio (the ratio of long to short sides) is generally 3:2, 4:3, 16:9, etc.), the side facing upward in the vertical direction is called the top face, and the opposite side is called the bottom face. Further, when the an image is captured such that up and down in the vertical direction of the subject coincide with up and down in the short-side direction of the rectangular image being captured by the digital camera 1, the side that is on the left when viewed from the subject side is called the left face, and the opposite side is called the right face. The above definitions are not intended to limit the orientation of the digital camera 1 when it is used.

Based on the above definitions, FIG. 1 is an oblique view illustrating the front face, top face, and right face.

The same definitions apply not only to the six sides of the digital camera 1, but also to the six sides of the various constituent members disposed in and on the digital camera 1. Specifically, the above definitions apply to the six sides of the various constituent members in the state in which they have been disposed in or on the digital camera 1.

As shown in FIG. 1, a three-dimensional perpendicular coordinate system (right-hand system) is defined, having a Y axis perpendicular to the front face of the camera housing 2. Based on this definition, the direction to the front face side from the rear face side is called the Y axis positive direction, the direction to the left face side from the right face side is called the X axis positive direction, and the direction to the top face side from the bottom face side and perpendicular to the X and Y axes is called the Z axis positive direction. These definitions apply to all of the drawings.

2: Overall Configuration of Digital Camera

Figure 3:
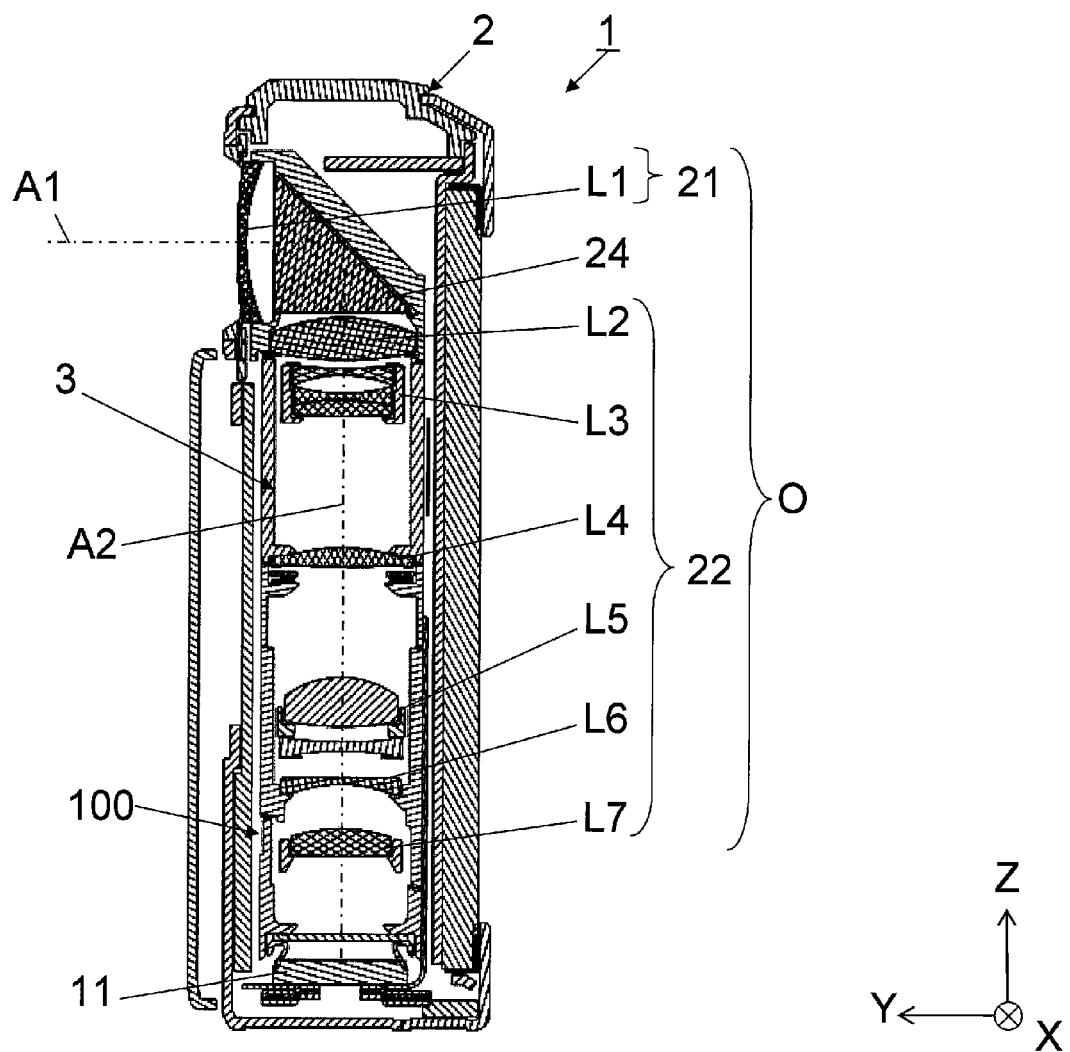
FIG. 3 is a cross sectional schematic of an imaging optical system and a lens barrel of the digital camera.

As shown in FIGS. 1 and 3, the digital camera 1 mainly includes a camera housing 2 that houses various units, the imaging optical system O that forms an optical image of a subject, and the lens barrel 3 that movably supports the imaging optical system O. An image blur correction device 10 that corrects image blur, and an imaging element 11 that has a CCD (charge coupled device) sensor, a CMOS (complementary metal-oxide semiconductor) sensor, or the like, for example, and that converts an optical image into an image signal are housed inside the lens barrel 3.

A release button 4, a touch panel 5, a power switch 6, and a zoom adjustment lever 7 are provided to the top or rear face of the camera housing 2 so that the user can control imaging operations and so forth. The release button 4 is pressed by the user to input the exposure timing. The touch panel 5 is disposed on a liquid crystal monitor 8. The user touches the touch panel 5 while looking at a control screen displayed on the liquid crystal monitor 8 by a controller 9, and thereby makes various settings related to imaging. The power switch 6 is operated by the user to turn the digital camera 1 on and off. The zoom adjustment lever 7 is operated by the user to adjust the zoom ratio, and is able to rotate within a specific angular range around the release button 4. The release button 4, the touch panel 5, the power switch 6, and the zoom adjustment lever 7 are examples of manipulation members. A manipulation member may be a push button, a slide switch, a lever, a touch panel, or the like, and may have any form desired.

The liquid crystal monitor 8, which displays an image acquired by the imaging element 11, is provided to the rear face of the camera housing 2. Inside the camera housing 2 are disposed the controller 9, which has a microprocessor, for example, and performs various controls in the digital camera 1, and a removable storage element 12 that stores the images acquired by the imaging element 11.

3: Configuration of Imaging Optical System and Lens Barrel

FIG. 3 is a cross sectional schematic of the imaging optical system O and the lens barrel 3.

The imaging optical system O has a first optical system 21, a bending optical system, and a second optical system 22. The first optical system 21 has a first optical axis A1 and guides light from the subject into the camera housing 2. The bending optical system is located on the first optical axis A1 and bends the light guided by the first optical system 21 in a direction along a second optical axis A2 that is perpendicular to the first optical axis A1. The second optical system 22 has the second optical axis A2. The imaging element 11, which converts an optical image of a subject emitted from the second optical system 22 into an image signal, is disposed on the emission side of the second optical system 22.

The first optical system 21 has a first lens group L1 disposed along the first optical axis A1.

The first lens group L1 is a lens group that has negative power, for example, and is an objective lens that takes in light from the subject. The bending optical system in this embodiment has a prism 24 that bends the optical axis 90 degrees, but in another embodiment may have a mirror or other such reflecting member.

The second optical system 22 has a second lens group L2 disposed near the prism 24, and a third lens group L3, a fourth lens group L4, a fifth lens group L5, a sixth lens group L6, and a correcting lens L7 disposed between the second lens group L2 and the imaging element 11. The second lens group L2 collects light emitted from the prism 24. The first lens group L1, the prism 24, and the second lens group L2 as a whole have a positive power. The third lens group L3 is a zooming lens group. The third lens group L3 is able to move in the direction of the second optical axis A2. This movement changes the focal distance. The fourth lens group L4 is fixed in the direction of the second optical axis A2. The fifth lens group L5 is a focusing lens group. The fifth lens group L5 is able to move in the direction of the second optical axis A2, and this movement changes the focal state. The sixth lens group L6 is fixed in the direction of the second optical axis A2. The light emitted from the sixth lens group L6 goes through the correcting lens L7 (an example of an optical element) facing the sixth lens group L6, and forms an image on the imaging element 11. The imaging element 11 faces the correcting lens L7.

4: Configuration of Image Blur Correction Device

The image blur correction device 10 has a shake detection sensor (not shown) and a lens drive device 100 (an example of a drive device). The shake detection sensor has a gyro sensor, for example, and detects shake in the yaw correction direction and the pitch correction direction of the camera housing 2. The lens drive device 100 (an example of a drive device) drives the correcting lens L7 in two directions according to the detection result of the shake detection sensor. The two directions in which the lens drive device 100 drives the correcting lens L7 according to a signal from the shake detection sensor to correct shake of the camera housing 2 are the X axis positive and negative direction (an example of a first direction; hereinafter referred to as the yaw correction direction) and the Y axis positive and negative direction (an example of a second direction; hereinafter referred to as the pitch correction direction). The X axis direction and the Y axis direction are both perpendicular to the second optical axis A2.

5: Configuration of Lens Drive Device

Figure 4:
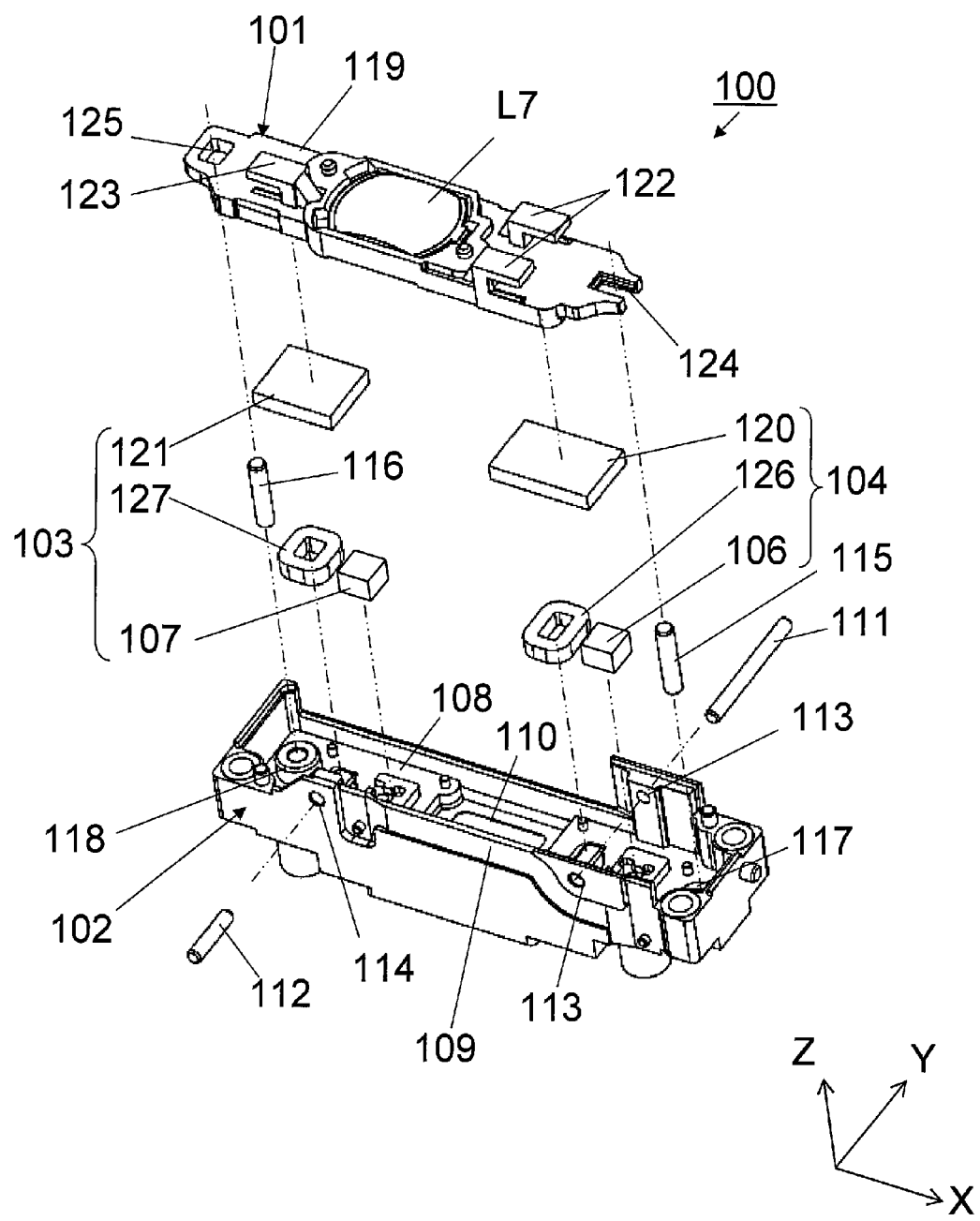
FIG. 4 is an exploded oblique view of a lens drive device pertaining to an embodiment of the present invention.
Figure 5:
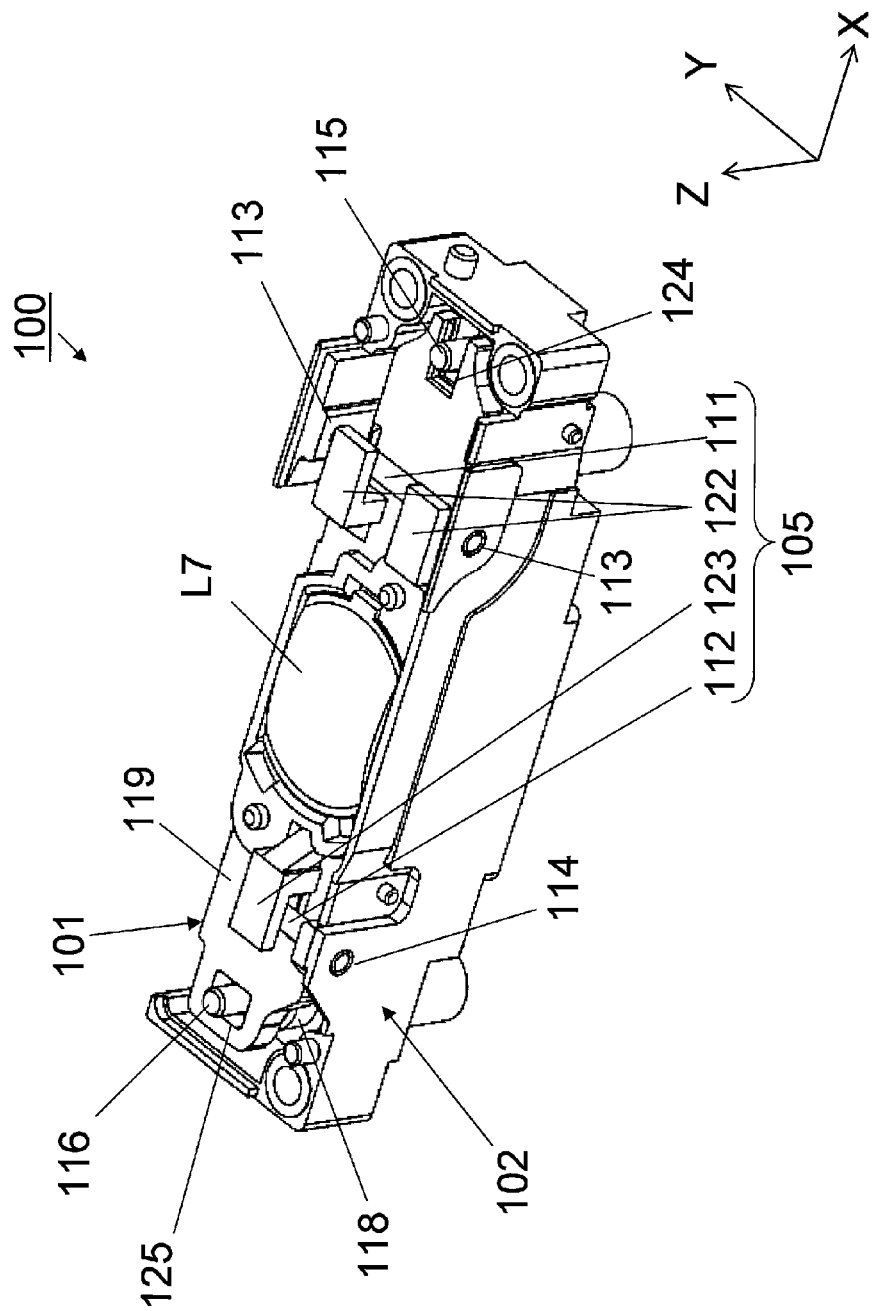
FIG. 5 is an oblique view of the lens drive device.
Figure 6:
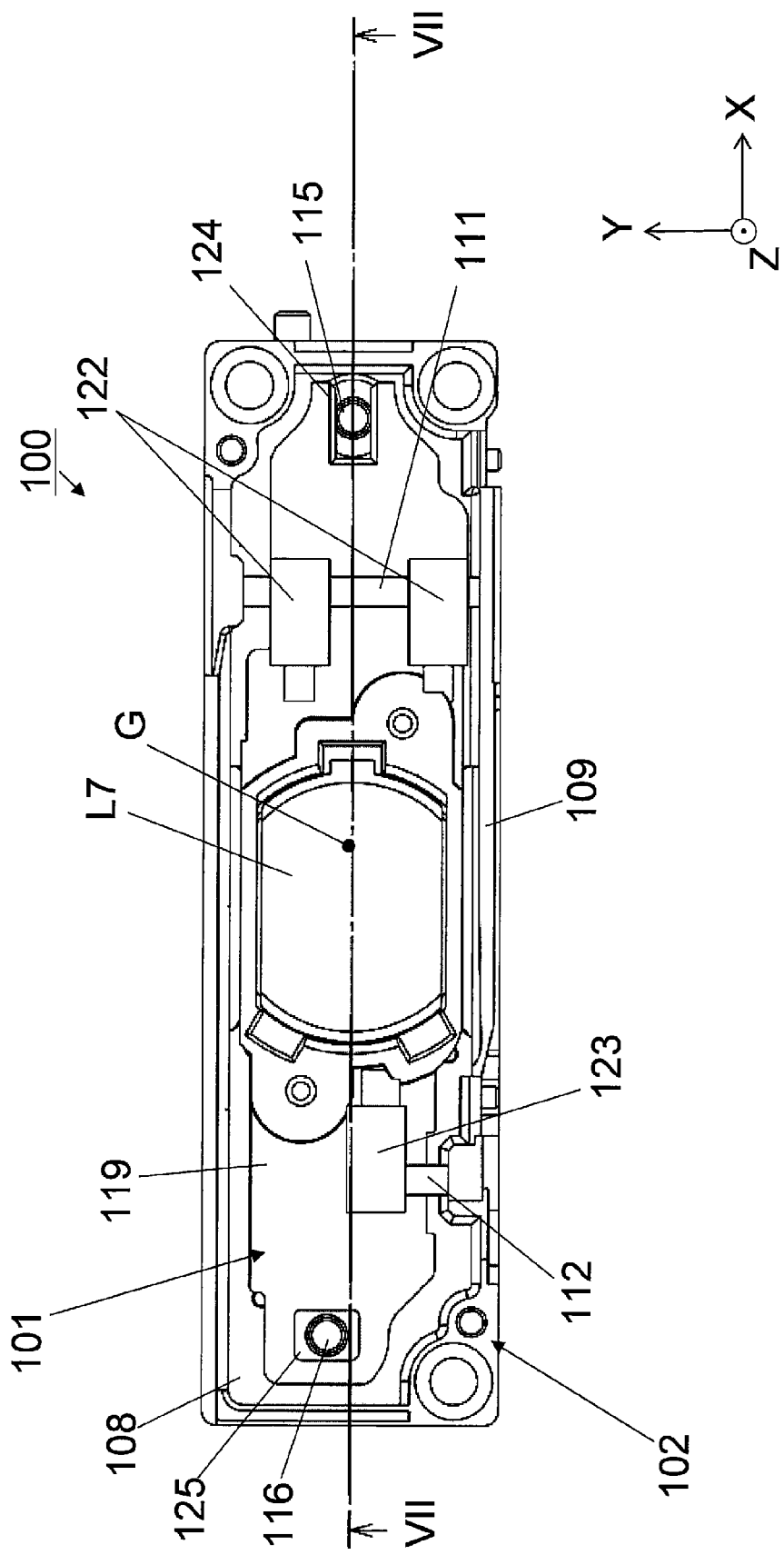
FIG. 6 is a plan view of the lens drive device.
Figure 7:
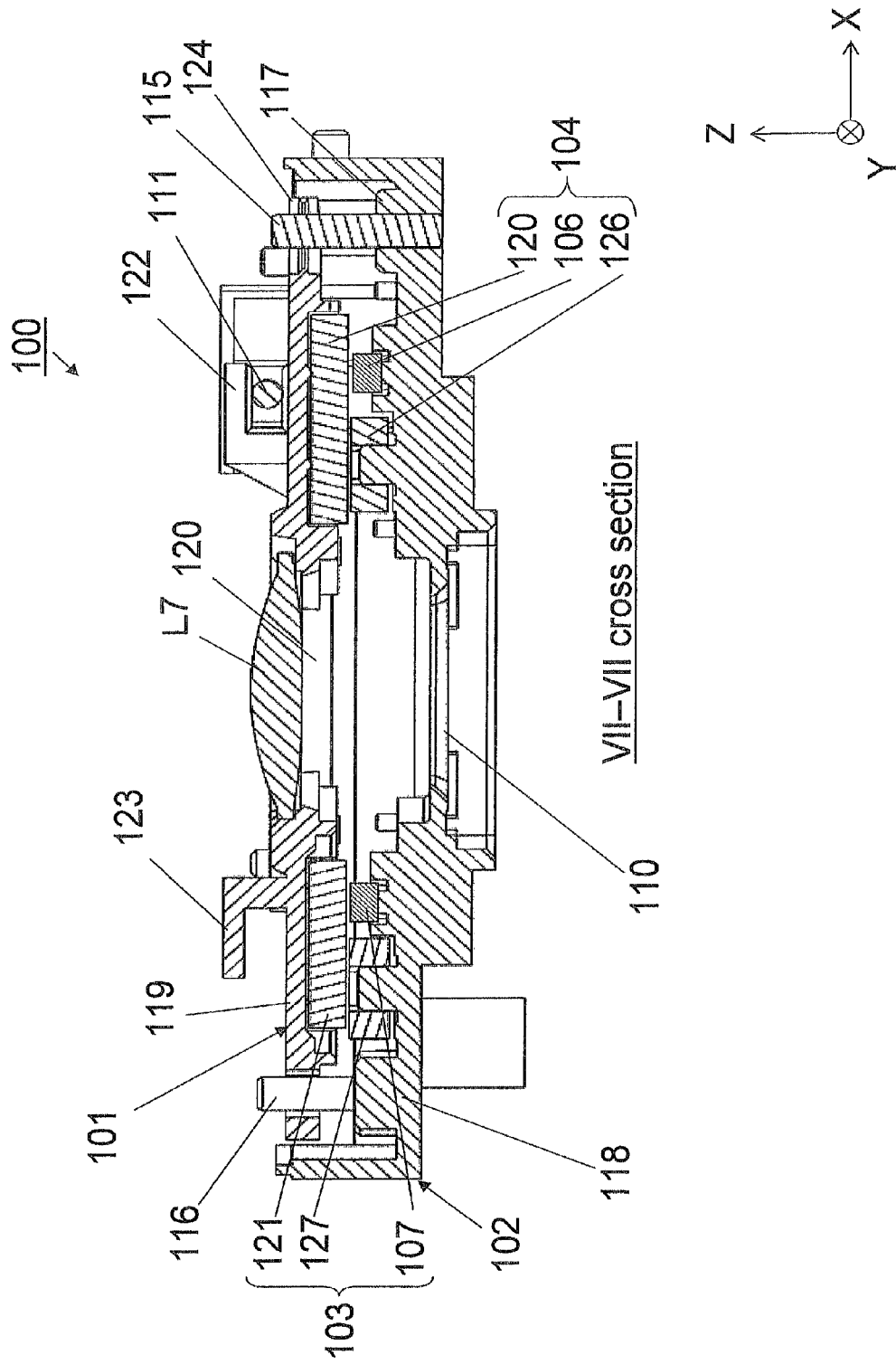
FIG. 7 is a VII-VII cross section of FIG. 6.

FIG. 4 is an exploded oblique view of the lens drive device 100 pertaining to an embodiment of the present invention. FIG. 5 is an oblique view thereof. FIG. 6 is a plan view thereof. FIG. 7 is a VII-VII cross section of FIG. 6.

The lens drive device 100 has a moving member 101 that supports the correcting lens L7, a stationary member 102 that supports the moving member 101 so as to allow the moving member 101 to move in the pitch correction direction and the yaw correction direction, a pitch actuator 103 (an example of a second actuator) that drives the moving member 101 in the pitch correction direction, and a yaw actuator 104 (an example of a first actuator) that drives the moving member 101 in the yaw correction direction. The lens drive device 100 is also provided with a guide component 105 that guides the moving member 101 in the pitch correction direction and the yaw correction direction. The yaw actuator 104 has a first magnet 120 that is substantially cuboid in shape, a first coil 126, and a yaw Hall sensor 106 (an example of a magnetism detection element), which is a Hall element that detects the position of the moving member 101 in the yaw correction direction with respect to the stationary member 102. The pitch actuator 103 has a second magnet 121 that is substantially cuboid in shape, a second coil 127, and a pitch Hall sensor 107, which is a Hall element that detects the position of the moving member 101 in the pitch correction direction with respect to the stationary member 102. The yaw actuator 104 and the pitch actuator 103 are disposed with the correcting lens L7 sandwiched in between in the yaw correction direction.

The stationary member 102 has a substantially rectangular plate 108 that is fixed inside the lens barrel 3, and a wall 109 that extends in the second optical axis A2 direction from the plate 10. The stationary member 102 is fixed with respect to the camera housing 2. An opening 110 is formed in the approximate center of the plate 108. The opening 110 is substantially in the form of a rectangle whose four corners have been rounded, and the light imaged by the correcting lens L7 can pass through the opening 110. The opening 110 may have a simple rectangular shape, elliptical shape, circular shape, etc. A first support component 113 and a second support component 114 for supporting a first guide shaft 111 and a second guide shaft 112, respectively, are formed on the wall 109, and a third support component 117 and a fourth support component 118 for supporting a rotary shaft 115 and a rotation restricting shaft 116, respectively, are formed on the plate 108. The first support component 113 is disposed at two places that are spaced apart in the Y axis direction more to the X direction positive side (the right side in FIG. 4) in the yaw correction direction than the opening 110, and the second support component 114 is disposed at one place more to the X direction negative side (the left side in FIG. 4) in the yaw correction direction than the opening 110. The third support component 117 is disposed more to the X direction positive side in the yaw correction direction than the opening 110, and the fourth support component 118 is disposed more to the X direction negative side in the yaw correction direction than the opening 110.

The moving member 101 has a moving frame 119 supported movably in the pitch correction direction and the yaw correction direction with respect to the stationary member 102. The first magnet 120 and the second magnet 121 are fixed to the moving frame 119.

The moving frame 119 is a member with a substantially rectangular shape, whose size as viewed in the second optical axis A2 direction is smaller than the stationary member 102. An elliptical opening 131 for transmitting the light that will pass through the correcting lens L7 is formed in the center of the moving frame 119. The opening 131 in the moving frame 119 also has a substantially rectangular shape in which the four corners are rounded, but it may have a simple rectangular shape, etc. A first guide mechanism 122 that engages with the first guide shaft 111 is provided on the X direction positive side (the right side in FIG. 4) in the yaw correction direction of the moving frame 119, and a second guide mechanism 123 that engages with the second guide shaft 112 is provided on the X direction negative side (the left side in FIG. 4) in the yaw correction direction of the moving frame 119. In other words, the moving member 101 and the stationary member 102 engage with each other by means of the first guide shaft 111 and the first guide mechanism 122 (an example of a first restrictor) disposed on the yaw actuator 104 side of the correcting lens L7 when viewed in the second optical direction A2, and engage with each other by means of the second guide shaft 112 and the second guide mechanism 123 (an example of a second restrictor) disposed on the pitch actuator 103 side of the correcting lens L7 when viewed in the second optical direction A2. The first guide mechanism 122 and the second guide mechanism 123 support the weight of the moving member 101, and slide with respect to the first guide shaft 111 and the second guide shaft 112 to support the moving member 101 movably in the pitch correction direction and the yaw correction direction with respect to the stationary member 102, and to support the moving member 101 immovably in the second optical axis A2 direction with respect to the stationary member 102. The first guide shaft 111, the second guide shaft 112, the first guide mechanism 122, and the second guide mechanism 123 constitute the guide component 105. The moving member 101 and the stationary member 102 are guided by the guide component 105 so as to slide relatively in the pitch correction direction and the yaw correction direction, but are restricted so as not to move relatively in the second optical axis A2 direction.

A rotary guide groove 124 that engages with the rotary shaft 115 is formed at the end (the right end in FIG. 4) of the moving frame 119 on the X direction positive side in the yaw correction direction. The rotary shaft 115 slides in the rotary guide groove 124. Therefore, the moving frame 119 is able to move linearly in the same direction as the direction in which the rotary guide groove 124 extends, that is, in the yaw correction direction, and able to rotate in the pitch correction direction around the rotary shaft 115. Consequently, the correcting lens L7 supported by the moving frame 119 is able to move in the pitch correction direction and the yaw correction direction. Meanwhile, a rotation restricting groove 125 is formed at the end of the moving frame 119 on the X direction negative side (the left end in FIG. 4). The rotation restricting groove 125 is substantially square, and engages with the rotation restricting shaft 116 with a specific gap in between the rotation restricting groove 125 and the rotation restricting shaft 116. The movement range of the moving frame 119 in the pitch correction direction and the yaw correction direction is restricted at the position where the rotation restricting shaft 116 and the rotation restricting groove 125 come into contact. The rotation restricting groove 125 may have any shape other than being substantially square, so long as movement can be restricted in the pitch correction direction and the yaw correction direction. The rotary shaft 115 and the rotation restricting shaft 116 is fixed by press-fitting or the like to the third support component 117 and the fourth support component 118, respectively, for example.

The first magnet 120 is attached to the moving frame 119 on the X direction positive side (the right side in FIG. 4) in the yaw correction direction, and the second magnet 121 is attached on the X direction negative side (the left side in FIG. 4) of the moving frame 119, with the correcting lens L7 sandwiched between the first magnet 120 and the second magnet 121. At this point, the first guide mechanism 122 and the first magnet 120 are disposed so as to overlap each other when viewed in the second optical axis A2 direction, and the second guide mechanism 123 and the second magnet 121 are similarly disposed so as to overlap each other when viewed in the second optical axis A2 direction.

Figure 8:
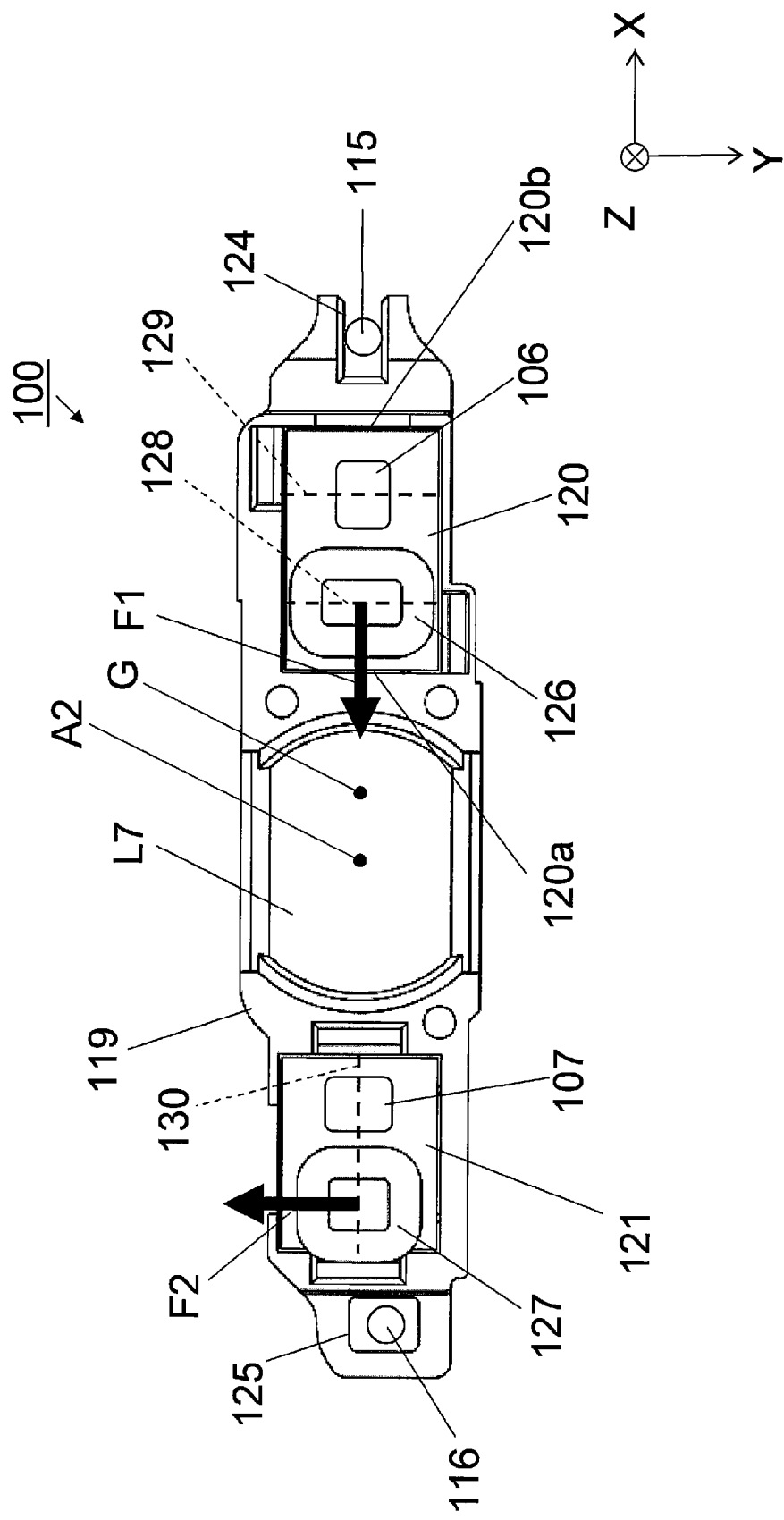
FIG. 8 is a plan view schematic of the lens drive device.

As shown schematically in FIG. 8, the yaw actuator 104 has the first coil 126 fixed to the stationary member 102, and the first magnet 120 fixed to the moving frame 119 at a position that faces the first coil 126 in the second optical axis A2 direction. Also, the pitch actuator 103 has the second coil 127 fixed to the stationary member 102, and the second magnet 121 fixed to the moving frame 119 at a position that faces the second coil 127 in the second optical axis A2 direction. Upon receiving the magnetic force generated when current is sent to the first coil 126, the first magnet 120 moves in the yaw correction direction with respect to the first coil 126, and upon receiving the magnetic force generated when current is sent to the second coil 127, the second magnet 121 moves in the pitch correction direction with respect to the second coil 127.

The first magnet 120 is magnetized to have six poles. As shown in FIG. 8, the first magnet 120 is magnetized to have three poles when viewed in the second optical axis A2 direction. A first polarization line 128 and a second polarization line 129, which are boundary lines between different magnetic poles, are disposed side by side in the yaw correction direction. The first polarization line 128 and the second polarization line 129 extend perpendicular to the yaw correction direction and parallel to the pitch correction direction, over the entire width of the first magnet 120 in the pitch correction direction. The first polarization line 128 is disposed in a first non-magnetized region of the first magnet 120, and the second polarization line 129 is disposed in a second non-magnetized region of the first magnet 120. The second magnet 121 is magnetized to have two poles. A third polarization line 130, which is a boundary line between different magnetic poles, extends perpendicular to the pitch correction direction and parallel to the yaw correction direction, over the entire width of the second magnet 121 in the yaw correction direction. More specifically, the first magnet 120 is magnetized so that an N pole, the second polarization line 129, an S pole, the first polarization line 128, and an N pole are arranged in that order from the end on the X direction positive side toward the X direction negative side, when viewed in the second optical axis A2 direction. The second magnet 121 is magnetized so that an N pole, the third polarization line 130, and an S pole are arranged in that order from the end on the Y direction positive side toward the Y negative direction.

The first coil 126 and the second coil 127 each has a lead wire that is wound around an axis that is parallel to the second optical axis A2 direction. The first coil 126 in this embodiment is fixed to the stationary member 102 so that its center (the drive center) is located on the first polarization line 128 when viewed in the second optical axis A2 direction, when the center of the correcting lens L7 is disposed in a reference position located on the second optical axis A2 (that is, in a state in which there is no shaking of the camera housing 2). The second coil 127 is fixed to the stationary member 102 so that its center (the drive center) is located on the third polarization line 130 when viewed in the second optical axis A2 direction and when the moving frame 119 is disposed in the reference position (that is, in a state in which there is no shaking of the camera housing 2). The first magnet 120 and the second magnet 121 are restricted in their range of movement in the yaw correction direction and the pitch correction direction by the rotation restricting shaft 116 and the rotation restricting groove 125, and the guide component 105 does not allow them to move in a direction perpendicular to these directions. As a result, no matter how much the camera housing 2 shakes, the first coil 126 is always disposed at a position facing the first polarization line 128, and the second coil 127 is always disposed at a position facing the third polarization line 130.

The drive force generator in the yaw correction direction included in the first coil 126 is the lead wire portion extending in the pitch correction direction. Accordingly, to obtain more drive force, the size of the first coil 126 may be increased in the pitch correction direction so that the portions of the first coil 126 other than the drive force generator do not overlap the first magnet 120 when viewed in the second optical axis A2 direction when the moving frame 119 is disposed in the reference position. If this is done, the lead wire portion extending in the pitch correction direction, which is the drive force generator of the first coil 126, will be larger, and the drive force of the first coil 126 will be greater. Similarly, the drive force generator in the pitch correction direction included in the second coil 127 is the lead wire portion extending in the yaw correction direction. Accordingly, to obtain more drive force, the size of the second coil 127 may be increased in the yaw correction direction so that the portions of the second coil 127 other than the drive force generator (if the pitch hole sensor 107 lies in the way, then only the portion that is farther away from the pitch hole sensor 107) do not overlap the second magnet 121 when viewed in the second optical axis A2 direction when the moving frame 119 is disposed in the reference position. If this is done, the lead wire portion extending in the yaw correction direction, which is the drive force generator of the second coil 127, will be larger, and the drive force of the second coil 127 will be greater.

The moving frame 119 must be able to move in the pitch correction direction and the yaw correction direction without interfering with other members. On the other hand, no such restrictions apply to the stationary member 102. That is, the external dimensions of the lens drive device 100 in the pitch correction direction and the yaw correction direction are influenced by whichever is larger: the movement range of the moving frame 119 in the pitch correction direction and the yaw correction direction or the external dimensions of the stationary member 102 in the pitch correction direction and the yaw correction direction. Therefore, increasing the external dimensions of the stationary member 102 over the external dimensions of the moving frame 119 has little effect on the external dimensions of the lens drive device 100 in both the pitch correction direction and the yaw correction direction. In view of this, as discussed above, when the first coil 126 and the second coil 127 are fixed to the stationary member 102 rather than to the moving frame 119, the external dimensions of the first coil 126 and the second coil 127 will not affect the external dimensions of the lens drive device 100 as long as those are within a range of the external dimension of the stationary member 102. Therefore, in this embodiment, drive force is maintained while the size of the lens drive device 100 is reduced by fixing the first coil 126 and the second coil 127 to the stationary member 102, and increasing the external dimensions of the first coil 126 and the second coil 127 within a range the external dimension of the stationary member 102.

The yaw Hall sensor 106 and the pitch Hall sensor 107 are able to detect themselves relative positions with respect to the first magnet 120 and the second magnet 121, respectively. The yaw Hall sensor 106 and the pitch Hall sensor 107 are both fixed to the stationary member 102. The yaw Hall sensor 106 is fixed at a position facing the first magnet 120, and the pitch Hall sensor 107 is fixed at a position facing the second magnet 121. The yaw Hall sensor 106 in this embodiment is fixed to the stationary member 102 so that its center is located on the second polarization line 129 when viewed in the second optical axis A2 direction when the moving frame 119 is disposed at the reference position (that is, in a state in which there is no shaking of the camera housing 2). The pitch Hall sensor 107 is fixed to the stationary member 102 so that its center is located on the third polarization line 130 when viewed in the second optical axis A2 direction when the moving frame 119 is disposed at the reference position (that is, in a state in which there is no shaking of the camera housing 2). The first magnet 120 and the second magnet 121 are restricted in their range of movement in the yaw correction direction and the pitch correction direction by the rotation restricting shaft 116 and the rotation restricting groove 125, and the guide component 105 does not allow them to move in a direction perpendicular to these directions. Therefore, no matter how much the camera housing 2 shakes, the yaw Hall sensor 106 is always disposed at a position facing the second polarization line 129, and the pitch Hall sensor 107 is always disposed at a position facing the third polarization line 130.

Therefore, the first magnet 120 has a function of driving the correcting lens L7 in the yaw correction direction, and a function of detecting the position of the correcting lens L7 in the yaw correction direction, and is used along with the first coil 126 and the yaw Hall sensor 106. The second magnet 121 has a function of driving the correcting lens L7 in the pitch correction direction, and a function of detecting the position of the correcting lens L7 in the pitch correction direction, and is used along with the second coil 127 and the pitch Hall sensor 107. In this embodiment, the pitch Hall sensor 107 is disposed more to the rotary shaft 115 side than the second coil 127. Therefore, there is comparatively little relative movement of the pitch Hall sensor 107 in the yaw correction direction with respect to the third polarization line 130 when the moving frame 119 is rotationally driven in the pitch correction direction around the rotary shaft 115, and position detection accuracy is improved. Also, the ratio of the distance from the rotary shaft 115 to the second coil 127 versus the distance from the rotary shaft 115 to the center of gravity G of the entire moving portion is greater, a larger rotational moment is produced by the drive force generated by the pitch actuator 103, and the pitch actuator 103 can be made smaller. The phrase "the center of gravity G of the entire moving portion" here is a combination of the centers of gravity of parts that move with respect to the stationary member 102, including the moving frame 119, the correcting lens L7, the first magnet 120, and the second magnet 121. Since the first magnet 120 is larger than the second magnet 121 in this embodiment, the center of gravity G is between the rotary shaft 115 and the center of the correcting lens L7 when viewed in the second optical axis A2 direction.

Also, in this embodiment, the yaw Hall sensor 106 is disposed more to the rotary shaft 115 side than the first coil 126. Therefore, there is comparatively little relative movement of the yaw Hall sensor 106 in the yaw correction direction when the moving frame 119 is rotationally driven in the pitch correction direction around the rotary shaft 115, and position detection accuracy is improved.

To drive the moving frame 119 stably and precisely, the center of gravity G of the entire moving portion is preferably disposed in a support polygon region. The support polygon region is formed by connecting the points where the moving member 101 and the stationary member 102 touch each other. In this embodiment, of the first guide mechanism 122 and the second guide mechanism 123, the first guide mechanism 122, whose engaged part is larger in size in the pitch correction direction, is disposed at a position that is closer to the center of gravity G of the entire moving portion. Therefore, in this embodiment, the center of gravity G of the entire moving portion is stably disposed in the support polygon region. The size in the pitch correction direction of the engaged part (or engaging surface 122a) of the first guide shaft 111 and the first guide mechanism 122 refers to as follows: if the first guide shaft 111 and the first guide mechanism 122 are contact with each other at two separate parts in the pitch correction direction, the distance between both ends in the pitch correction direction of the two parts, if they are contact with each other at only one part, the distance between both ends in the pitch correction direction of the only one part, and if they are contact with each other at only one contact point, zero. Also, the size in the pitch correction direction of the engaged part (or engaging surface 123a) of the second guide shaft 112 and the second guide mechanism 123 refers to as follows: if the second guide shaft 112 and the second guide mechanism 123 are contact with each other at two separate parts in the pitch correction direction, the distance between both ends in the pitch correction direction of the two parts, if they are contact with each other at only one part, the distance between both ends in the pitch correction direction of the only one part, and if they are contact with each other at only one point, zero. In this embodiment, the support polygon is an approximate triangle that links the two contact parts of the first guide shaft 111 and the first guide mechanism 122, and the one contact part of the second guide shaft 112 and the second guide mechanism 123. Furthermore, in this embodiment the first magnet 120 and the first guide mechanism 122 are disposed so as to overlap when viewed in the second optical axis A2 direction, and as a result the first guide mechanism 122 is disposed near the center of gravity G, and the center of gravity G of the entire moving portion is stably disposed within the support polygon (approximate triangle) region.

When the moving frame 119 is in the reference position, the center of the rotary shaft 115, the center of the yaw Hall sensor 106, the center of the first coil 126, the center of the correcting lens L7, the center of gravity G of the entire moving portion, the center of the pitch Hall sensor 107, and the center of the second coil 127 are disposed so that they are aligned in a substantially linear shape parallel to the yaw correction direction. When the moving frame 119 is in the reference position, the center of gravity G of the entire moving portion and the center of the first coil 126 are disposed so that they are aligned substantially parallel to the yaw correction direction. As a result, when the moving frame 119 is driven in the yaw correction direction from the reference position, no rotational moment is generated in the pitch correction direction, and the drive is very precise and efficient. Also, when the moving frame 119 is in the reference position, the center of gravity G of the entire moving portion, the center of the first coil 126, and the rotary shaft 115 are disposed substantially parallel to the yaw correction direction. As a result, when the moving frame 119 is driven in the yaw correction direction from the reference position, no rotational moment is generated in the pitch correction direction, the sliding load on the rotary guide groove 124 can be reduced, and the drive is very precise and efficient. When the moving frame 119 is in the reference position, the center of the yaw Hall sensor 106, the center of the pitch Hall sensor 107, the center of the correcting lens L7, and the center of the rotary shaft 115 are disposed so as to be linked in a straight line. As a result, the amount of movement in the yaw correction direction when the moving frame 119 moves rotationally from the reference position in the pitch correction direction can be minimized and made symmetrical on the positive and negative sides in the correction direction (Y direction), the effect on other shafts can be reduced, and the drive is very precise and efficient. When the moving frame 119 is in the reference position, the center of the first coil 126, the center of the correcting lens L7, and the rotary shaft 115 are disposed so as to be linked in a straight line. As a result, the amount of movement in the yaw correction direction when the moving frame 119 moves from the reference position in the pitch correction direction can be kept to a minimum, the effect on other shafts can be reduced, and the drive is very precise and efficient.

Figure 9:
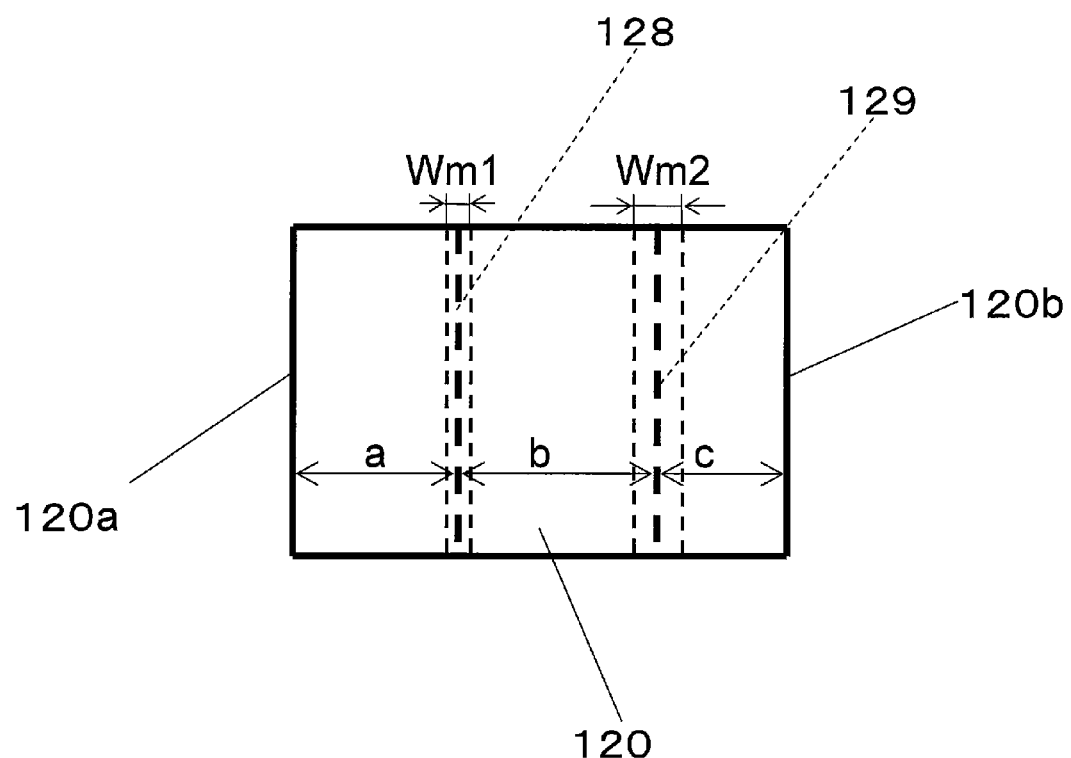
FIG. 9 is a plan view of a first magnet.

In this embodiment, the first magnet 120 has a substantially cuboid shape. When viewed in a direction in which the first polarization line 128 and the second polarization line 129 can be seen, the end (end face) 120a and the end (end face) 120b of the first magnet 120 extend parallel to the Y direction. The end 120a is closer to the first coil 126 than to the yaw Hall sensor 106. The end 120b is closer to the yaw Hall sensor 106 than to the first coil 126. Here, as shown in FIG. 9, we will let a be the length (in the X direction) from the end 120a of the first magnet 120 to the first polarization line 128, let b be the length (in the X direction) from the first polarization line 128 to the second polarization line 129, let c be the length (in the X direction) from the second polarization line 129 to the end 120b of the first magnet 120, and let d be the amount of movement (movable amount) of the moving frame 119 in the X direction with respect to the stationary member 102 (the amount of movement of the first magnet 120 in the X direction with respect to the yaw Hall sensor 106). d indicates the total of the amount of movement of the moving frame 119 in the +X direction from the reference position with respect to the stationary member 102, plus the amount of movement of the moving frame 119 in the −X direction from the reference position with respect to the stationary member 102. For example, if we assume that the moving frame 119 can move 0.10 mm in the +X direction from the reference position with respect to the stationary member 102, and can move 0.10 mm in the −X direction from the reference position with respect to the stationary member 102, then d=0.20 mm.

Also, we will let Wm1 be the width in the X direction of a first non-magnetized region in which the first polarization line 128 is present, and Wm2 the width in the X direction of a second non-magnetized region in which the second polarization line 129 is present.

Figure 11:
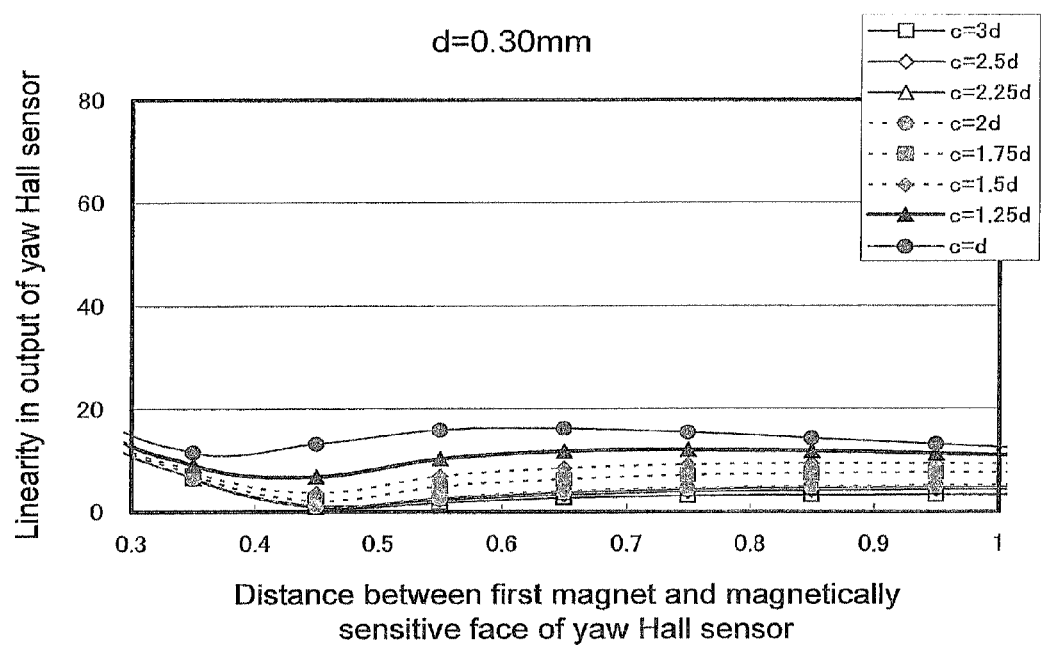
FIG. 11 is a graph of the relation between the linearity of output of a yaw Hall sensor and the distance from the first magnet to the magnetically sensitive face of the yaw Hall sensor, when the amount of movement d=0.30 mm.
Figure 12:
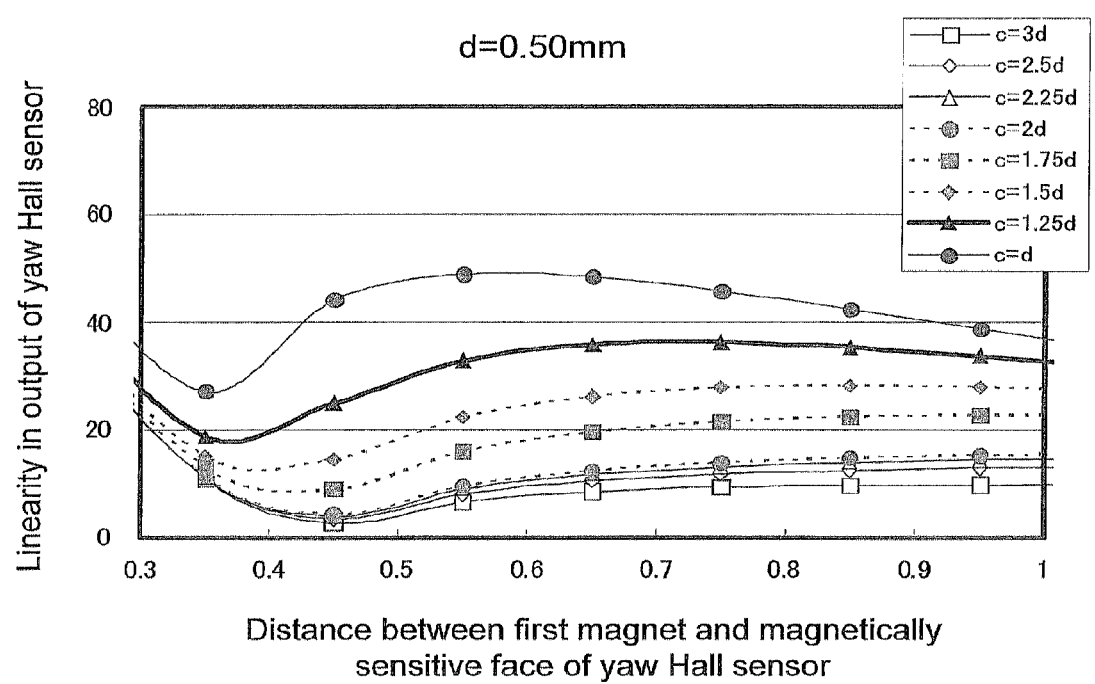
FIG. 12 is a graph of the relation between the linearity of output of a yaw Hall sensor and the distance from the first magnet to the magnetically sensitive face of the yaw Hall sensor, when the amount of movement d=0.50 mm.
Figure 13:
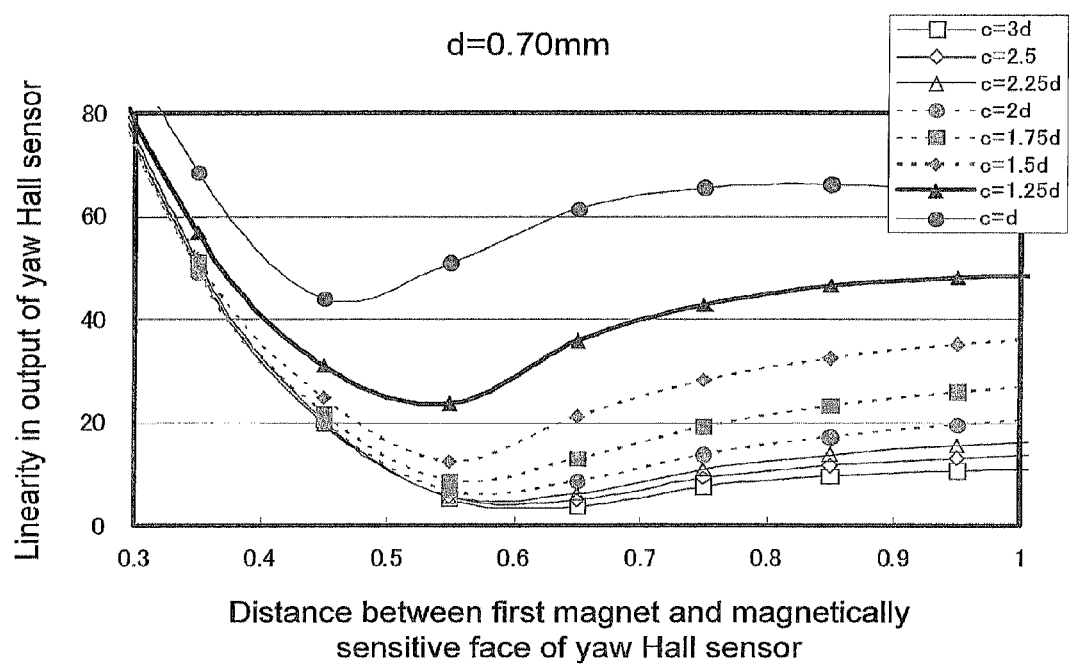
FIG. 13 is a graph of the relation between the linearity of output of a yaw Hall sensor and the distance from the first magnet to the magnetically sensitive face of the yaw Hall sensor, when the amount of movement d=0.70 mm.

FIGS. 11 to 13 are graphs of the relation between the linearity of the output from the yaw Hall sensor 106 (vertical axis) and the distance from the end face of the first magnet 120 on the yaw Hall sensor 106 side to the magnetically sensitive face of the yaw Hall sensor 106 (horizontal axis) when multiplying factors of the length c to the movement amount d are varied (more specifically, when c=3d, c=2.5d, c=2.25d, c=2d, c=1.75d, c=1.5d, c=1.25d, and c=d). FIG. 11 shows simulation results when d=0.30 mm. FIG. 12 shows simulation results when d=0.50 mm. FIG. 13 shows simulation results when d=0.70 mm.

Figure 14:
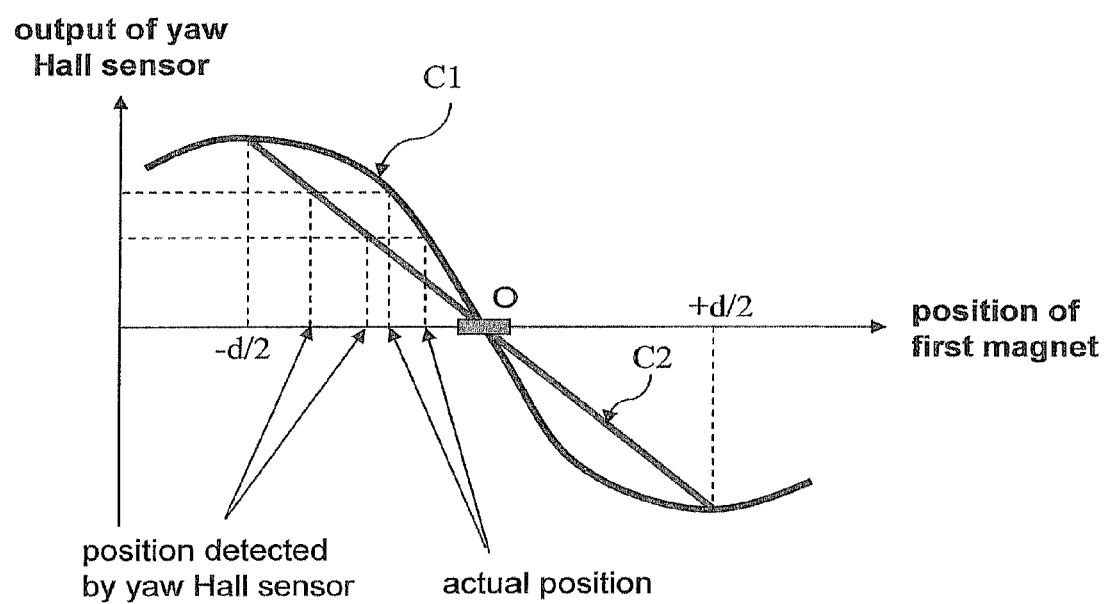
FIG. 14 is a diagram illustrating the linearity of output of a yaw Hall sensor.

FIG. 14 is a graph illustrating the linearity of the output from the yaw Hall sensor 106. FIG. 14 shows the relation between the output of the yaw Hall sensor 106 (vertical axis) and the position of the first magnet 120 (horizontal axis). The origin O in FIG. 14 is when the moving frame 119 is in the reference position, that is, when the center of the yaw Hall sensor 106 is on the second polarization line 129 as viewed in the second optical axis A2 direction. The curve C1 shows the actual output of the yaw Hall sensor 106. The straight line C2 is drawn by connecting two points indicating the output of the yaw Hall sensor 106 when the first magnet 120 is at the two end positions of its movable range (when the center of the yaw Hall sensor 106 is at the positions ±d/2 from the origin O). The linearity of the output from the yaw Hall sensor 106 is a maximum deviation between the curve C1 and the line C2 (the units in this case are μm (micrometers)). In other words, the linearity of the output from the yaw Hall sensor 106 indicates how much the curve C1, which shows the actual output of the yaw Hall sensor 106, deviates from the theoretical line C2. The smaller the value for the linearity of the output from the yaw Hall sensor 106 is, the more accurately the yaw Hall sensor 106 can detect the position of the first magnet 120. The better the detection accuracy of the yaw Hall sensor 106 is, the better the accuracy in shake correction is. On the other hand, when the detection accuracy of the yaw Hall sensor 106 decreases, there is a corresponding drop in the shake correction accuracy. Therefore, the smaller the value for the linearity of the output from the yaw Hall sensor 106 is, the crisper the image is, and the larger this value is, the fuzzier the image is.

The target performance for linearity in the output of the yaw Hall sensor 106 is dependent on the target performance of the movement amount d. In general, to keep image blurring within an acceptable range for the user, the value indicating the linearity in the output of the yaw Hall sensor 106 is preferably less than or equal to 15 μm when d=0.30 mm, is preferably less than or equal to 30 μm when d=0.50 mm, and is preferably less than or equal to 40 μm when d=0.70 mm. We can see from FIG. 11 that when d=0.30 mm, the value indicating the linearity in the output of the yaw Hall sensor 106 is 15 μm or less when the multiplying factor of the length c to the movement amount d is equal to or more than 1.25 times. We can see from FIG. 12 that when d=0.50 mm, the value indicating the linearity in the output of the yaw Hall sensor 106 is 30 μm or less when the multiplying factor of the length c to the movement amount d is equal to or more than 1.25 times. We can see from FIG. 13 that when d=0.70 mm, the value indicating the linearity in the output of the yaw Hall sensor 106 is 40 μm or less when the multiplying factor of the length c to the movement amount d is equal to or more than 1.25 times. Therefore, it can be seen that regardless of the target performance of the movement amount d, as long as the multiplying factor of the length c to the movement amount d is equal to or more than 1.25 times, then the target performance for linearity in the output of the yaw Hall sensor 106 can be ensured. Therefore, in this embodiment, the values for c and d are selected so that c≥1.25d. As a result, good detection accuracy in the yaw Hall sensor 106 is ensured, and this in turn boosts the drive performance of the yaw actuator 104.

The multiplying factor of the length c to the movement amount d is preferably equal to or more than 1.5 times. The reason, as can be seen from FIGS. 11 to 13, is that the value indicating linearity in the output of the yaw Hall sensor 106 fluctuates according to the distance from the end face of the first magnet 120 on the yaw Hall sensor 106 side to the magnetically sensitive face of the yaw Hall sensor 106 (horizontal axis). The larger is the multiplying factor of the length c to the movement amount d, the wider is the range along the horizontal axis over which the value indicating linearity in the output of the yaw Hall sensor 106 will be at or under a specific reference value. Saying that the value indicating linearity in the output of the yaw Hall sensor 106 will be at or under a specific reference value over a wider range along the horizontal axis means that the distance between the first magnet 120 and the magnetically sensitive face of the yaw Hall sensor 106 can be designed with more choices. In other words, if the value indicating linearity in the output of the yaw Hall sensor 106 is at or under a specific reference value over a wide range along the horizontal axis, this affords greater latitude in the design of the yaw actuator 104. It can be seen from FIGS. 11 to 13 that if c≥1.5d, then the target performance for linearity in the output of the yaw Hall sensor 106 can be ensured over a wide range along the horizontal axis, whether d=0.30 mm, d=0.50 mm, or d=0.70 mm. Therefore, greater latitude in design can be obtained by setting the multiplying factor of the length c to the movement amount d to be equal to or more than 1.5 times.

The drive performance of the yaw actuator 104 is determined by the relation between the drive force F generated by the yaw actuator 104 and the weight W of the entire moving portion (the weight of all moving parts with respect to the stationary member 102, including the moving frame 119, the correcting lens L7, the first magnet 120, and the second magnet 121). The value of F/W is preferably equal to or more than 2.5 if we take into account variance in the assembly of the actuator, individual differences between magnets, and changes due to environment temperature and so forth. The value of F/W does not necessarily have to be equal to or more than 2.5, but in this embodiment the temperature is assumed to be 25° C. during use, and the value of the length c is determined so that F/W will be equal to or more than 2.5.

Also, when designing an actuator composed of a magnet circuit, the design preferably has the magnets and coils facing each other even in a state in which the magnets have moved the maximum amount with respect to the coils. In this embodiment, from the above standpoint, the length a is set to be slightly more than the sum of one-half the width of the first coil 126 in the yaw correction direction plus d/2 (one-half the movement amount d). Because of this restriction, if the length b were designed to be shorter than the length a, then the center of the rotary shaft 115, the center of the yaw Hall sensor 106, the center of the first coil 126, and the center of the correcting lens L7 could not be disposed so as to be aligned substantially in a straight line parallel to the yaw correction direction, and it would be necessary to dispose the first coil 126 and the yaw Hall sensor 106 with an offset in the Y direction. Therefore, in this embodiment, the length a is made shorter than the length b, and the center of the rotary shaft 115, the center of the yaw Hall sensor 106, the center of the first coil 126, and the center of the correcting lens L7 are disposed so as to be aligned substantially in a straight line parallel with the yaw correction direction. As a result, the size of the yaw actuator 104 (including the first magnet 120) can be reduced in the Y direction, and the size of the digital camera 1 can be reduced in the Y direction, that is, the digital camera 1 can be made thinner. Also, in this embodiment the center of the second coil 127 and the center of the pitch Hall sensor 107 are disposed substantially aligned on the above-mentioned straight line, and the yaw actuator 104 and the pitch actuator 103 occupy substantially the same range in the Y direction. Therefore, the size of the lens drive device 100 can be further reduced in the Y direction, and the size of the digital camera 1 can be further reduced in the Y direction, that is, the digital camera 1 can be made even thinner.

As the length b is increased, the distance increases between the end of the first coil 126 on the X direction positive side and the end of the yaw Hall sensor 106 on the X direction negative side, so it is less likely that the magnetic field generated when current is sent to the first coil 126 will be detected by the yaw Hall sensor 106. Therefore, with this embodiment, the length b is made greater than the length a, which increases the accuracy of detecting the magnetic flux near the second polarization line 129 that is supposed to be detected by the yaw Hall sensor 106 (S/N ratio).

Figure 10:
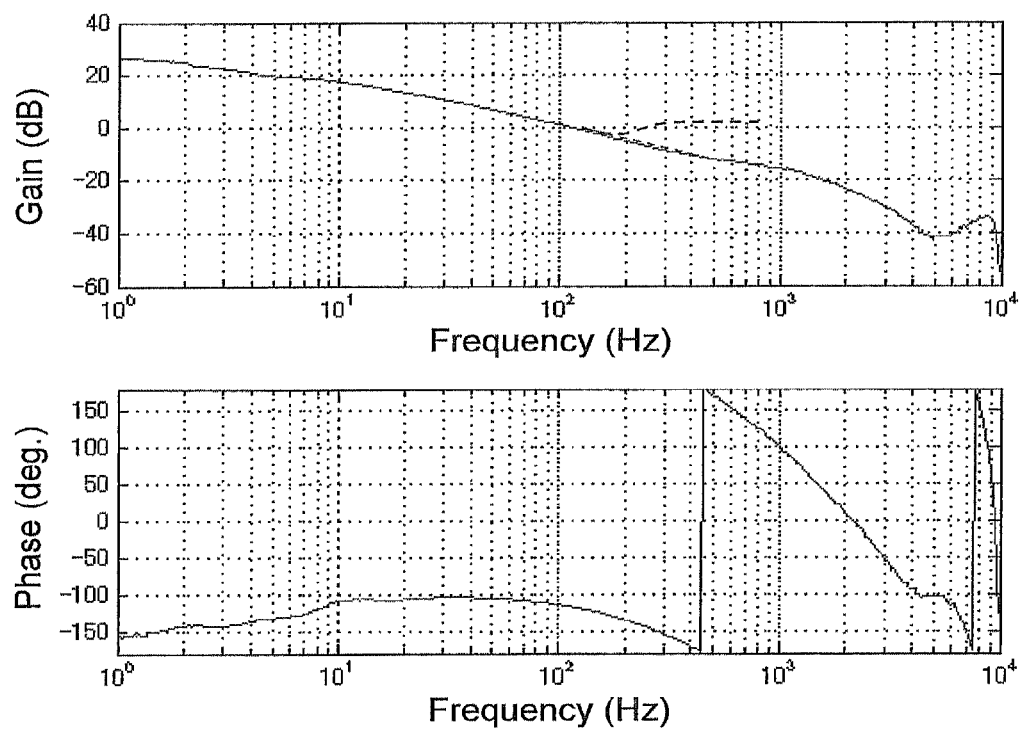
FIG. 10 is a control graph of the lens drive device.

When the yaw Hall sensor 106 detects the magnetic field generated by sending current to the first coil 126, and thereby the SN ratio deteriorates (the detection accuracy worsens), as shown in FIG. 10, the control characteristics worsen in the high-frequency region of the control characteristics chart for the lens drive device 100, and the control characteristics take on the appearance of a dotted line. This problem can be resolved by increasing the length b. Therefore, in this embodiment, this problem is solved by making the length b greater than the length a.

Also, in this embodiment, the non-magnetization width Wm2 is set to about 0.7 mm in order to reduce the linearity of the output of the yaw Hall sensor 106. As to the non-magnetization width Wm1, meanwhile, drive force from the first coil 126 is given priority, and the non-magnetization width Wm1 is set to about 0.5 to 0.6 mm so as to approach full magnetization (magnetization at which the non-magnetization width is zero). As a result, the non-magnetization width Wm1 is less than the non-magnetization width Wm2. Therefore, in this embodiment the width of the first magnet 120 in the X direction (a+b+c) is shortened by about 0.1 to 0.2 mm, as compared when the non-magnetization width Wm1 is set to about 0.7 mm like the non-magnetization width Wm2. Therefore, the first magnet 120 is lighter in weight, and the drive performance of the yaw actuator 104 is improved.

Also, with this embodiment, the length c is shortened to the minimum length at which the magnetic field near the second polarization line 129 can be detected, and the length c is made less than the length a. As a result, the first magnet 120 is smaller in the X direction and lighter, and an increase in the drive performance of the lens drive device 100 is achieved.

Finally, in this embodiment, the relation between the lengths a, b, and c is b>a>c. As a result, the length c that is ideal for detecting the magnetic field near the second polarization line 129 can be set independently from the lengths a and b that are needed to obtain the drive force generated together by the first coil 126 and the first magnet 120. Therefore, the size can be reduced in the X and Y directions, the weight can be reduced, and the propulsion (drive performance) can be optimized.

Also, it is possible to perform magnetization according to the required performance of each region of the first magnet 120, and this affords further optimization in the size and weight reduction and the propulsion (drive performance).

6: Operation of Lens Drive Device

The lens drive device 100 is controlled according to the output from a shake detection sensor. If the shake detection sensor detects shaking of the camera housing 2 in the pitch correction direction and the yaw correction direction due to hand shake or the like, the controller 9 controls so that the current sent to the first coil 126 corresponds to the detection result of the shake detection sensor and the detection result of the yaw Hall sensor 106. Also, the controller 9 controls so that the current sent to the second coil 127 corresponds to the detection result of the shake detection sensor and the detection result of the pitch Hall sensor 107. As a result, the correcting lens L7 is driven in the pitch correction direction and the yaw correction direction so as to eliminate image blurring caused by shaking of the camera housing 2.

When current flows in a specific direction in the first coil 126, this generates the electromagnetic force in the yaw correction direction indicated by the drive force vector F1 in FIG. 8. As a result, the correcting lens L7 moves from the reference position within a range in which the rotation restricting groove 125 does not hit the rotation restricting shaft 116, according to the guidance of the guide component 105 and the rotary guide groove 124. Meanwhile, when current flows in a specific direction in the second coil 127 this generates the electromagnetic force in the pitch correction direction indicated by the drive force vector F2 in FIG. 8. As a result, the correcting lens L7 moves from the reference position within a range in which the rotation restricting groove 125 does not hit the rotation restricting shaft 116, according to the guidance of the guide component 105. When current flows in the opposite direction in the first coil 126, the correcting lens L7 moves in the opposite direction in the yaw correction direction, and when current flows in the opposite direction in the second coil 127, the correcting lens L7 moves in the opposite direction in the pitch correction direction.

7: Other Embodiments

The lens drive device pertaining to the present invention is not limited to or by the above embodiment, and various modifications and changes are possible without departing from the gist of the present invention.

(1)

The correcting lens L7 rotated around the rotary shaft 115 above, but the lens drive device 100 is not limited to this constitution. For example, the moving member 101 may be biased by a spring or the like and brought into contact with the stationary member 102, and the moving member 101 may be supported completely movably in a linear direction, two ways, with respect to the stationary member 102.

(2)

The pitch actuator 103 and the yaw actuator 104 were disposed so as to sandwich the correcting lens L7, but are not limited to this configuration. For example, the pitch actuator 103 and the yaw actuator 104 may be disposed on the same side of the correcting lens L7.

(3)

The first magnet 120 may be fixed to the stationary member 102, and the first coil 126 may be fixed to the moving member 101. Also, the second magnet 121 may be fixed to the stationary member 102, and the second coil 127 may be fixed to the moving member 101.

(4)

The imaging element 11, which converts an optical image into an electrical signal, may be selected instead of or in addition to the correcting lens L7 as the optical element driven by the lens drive device 100. In this case, the lens drive device 100 discussed above drives the correcting lens L7 and/or the imaging element 11, and moves the two relatively, so that shaking of the camera housing 2 can be corrected.

Alternatively, another lens, or a prism, mirror, or other bending element that bends the optical axis, or any other optical element that can be used in an imaging device may be selected as the optical element driven by the lens drive device 100.

(5)

The imaging optical system O is not limited to that in the above embodiment. For example, the first lens group L1, the prism 24, and the second lens group L2 may as a whole have a negative power.

(6)

The rotary shaft 115 may be disposed at the moving member 101, and the rotary guide groove 124 may be formed in the stationary member 102. In this case, the moving member 101 is able to move rotationally in the pitch correction direction around the rotary shaft 115, and is able to move linearly in the yaw correction direction when the rotary shaft 115 slides in the rotary guide groove 124.

(7)

The correcting lens L7 need not be a single lens, and may instead be a correcting lens group having a plurality of lenses.

(8)

The second guide mechanism 123 and the second guide shaft 112 may come into contact at two parts. In this case, the center of gravity G of the entire moving portion is preferably disposed in the support polygon (substantially square). The support polygon is formed by connecting the two contact parts of the first guide mechanism 122 and the second guide shaft 112 and the two contact parts of the second guide mechanism 123 and the second guide shaft 112. In the above embodiment, the first magnet 120 and the second magnet 121 are disposed so as to overlap the first guide mechanism 122 and the second guide mechanism 123, respectively, when viewed in the second optical axis A2 direction. As a result, the first guide mechanism 122 and the second guide mechanism 123 are disposed close together. In a modification example, the center of gravity G of the entire moving portion can be disposed stably in the region of a support polygon (substantially square). The support polygon is formed by connecting the two contact parts of the first guide mechanism 122 and the first guide shaft 111 and the two contact parts of the second guide mechanism 123 and the second guide shaft 112. Furthermore, of the first guide mechanism 122 and the second guide mechanism 123, the one with the larger engagement part in the pitch correction direction (the distance between the two contact parts) is disposed at a position nearer the center of gravity G of the entire moving portion. As a result, the center of gravity G of the entire moving portion can be disposed more stably within the support square region.

(9)

The length a and the length c may be made equal or substantially equal, and the size of Wm1 and Wm2 may be made equal or substantially equal. In this case, there is no longer attachment directionality of the first magnet 120. Specifically, there is no need to manage the direction of the first magnet 120 after magnetization of the first magnet 120, so management cost can be reduced.

(10)

In the above embodiment, the first magnet 120 was a magnet that was magnetized so that three magnetic poles were aligned when viewed in one direction, but may instead be a magnet that is magnetized so that four or more magnetic poles are aligned when viewed in one direction. In this case, the three or more polarization lines will be aligned in parallel. The yaw Hall sensor 106 is preferably disposed at a position facing the endmost polarization line in the direction in which these three or more polarization lines are aligned.

INDUSTRIAL APPLICABILITY

The actuator and so forth disclosed herein are useful as an actuator and so forth having a magnet that is magnetized so that three or more magnetic poles are aligned, and drive performance can be enhanced. In particular, the actuator and so forth disclosed herein are useful in fields that require both a reduction in thickness and higher accuracy in an image blur correction device.

GENERAL INTERPRETATION OF TERMS

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of an actuator, and a driving device and an imaging device equipped with the actuator. Accordingly, these terms, as utilized to describe the present invention should be interpreted relative to an actuator, and a driving device and an imaging device equipped with the actuator.

The term "configured" as used herein to describe a component, section, or part of a device implies the existence of other unclaimed or unmentioned components, sections, members or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An actuator comprising:
   a coil;
   a magnet disposed adjacent to the coil, the magnet being configured to move a maximum predetermined distance relative to the coil via a magnetic force generated when current is passed through the coil, the magnet including a first polarization line perpendicular to the direction in which the magnet moves relative to the coil, and a second polarization line parallel to the first polarization line, the coil facing the first polarization line; and
   a magnetism detection element configured to detect a position of the magnet,
   the magnetism detection element facing the second polarization line,
   the length from the second polarization line to a first end of the magnet is equal to or greater than 1.25 times the maximum predetermined distance, the first end being closer to the magnetism detection element than to the coil.

2. The actuator according to claim 1, wherein
the length from the second polarization line to the first end of the magnet is equal to or greater than 1.5 times the predetermined distance.

3. The actuator according to claim 2, wherein
the length from the second polarization line to the first end of the magnet is equal to or less than the length from the first polarization line to a second end of the magnet, the second end being closer to the coil than to the magnetism detection element.

4. The actuator according to claim 2, wherein
the width of a non-magnetized region of the magnet in which the first polarization line is located is equal to or more than the width of a non-magnetized region of the magnet in which the second polarization line is located.

5. The actuator according to claim 1, wherein
the length from the second polarization line to the first end of the magnet is equal to or less than the length from the first polarization line to a second end of the magnet, the second end being closer to the coil than to the magnetism detection element.

6. The actuator according to claim 5, wherein
the width of a non-magnetized region of the magnet in which the first polarization line is located is equal to or more than the width of a non-magnetized region of the magnet in which the second polarization line is located.

7. The actuator according to claim 1, wherein
the width of a non-magnetized region of the magnet in which the first polarization line is located is equal to or greater than the width of a non-magnetized region of the magnet in which the second polarization line is located.

8. A drive device comprising:
   a moving member movable along a first direction and along a second direction that intersects with the first direction;
   a stationary member that supports movement of the moving member along the first and second directions;
   a first actuator, according to the actuator of claim 1, disposed between the moving member and the stationary member and configured to drive the moving member in the first direction; and
   a second actuator disposed between the moving member and the stationary member and configured to drive the moving member in the second direction.

9. The drive device according to claim 8, further comprising:
   a rotary shaft coupled to one end of the stationary member and the moving member, the rotary shaft being engaged with a rotary guide groove formed in one of the stationary member or the moving member,
   the moving member being configured to rotate in the second direction around the rotary shaft and to move in a straight line in the first direction via the rotary shaft sliding in the rotary guide groove.

10. The drive device according to claim 9, wherein
the magnetism detection element is positioned more to the rotary shaft side than the coil.

11. The drive device according to claim 10, further comprising:
an optical element affixed to the moving member,
wherein the center of the optical element, the center of the coil, and the center of the magnetism detection element are aligned substantially linearly in the first direction.

12. The drive device according to claim 11, wherein
the optical element is disposed between the first actuator and the second actuator in the first direction, and
the moving member includes a first restrictor and a second restrictor, the stationary member and the moving member being engaged with each other via the first and second restrictors and are restricted from moving in a third direction perpendicular to the first and second directions, the first restrictor being disposed on the first actuator side of the optical element when viewed in the third direction, and the second restrictor being disposed on the second actuator side of the optical element when viewed in the third direction,
the size of the engaging surface of the first restrictor is greater than the size of the engaging surface of the second restrictor.

13. The drive device according to claim 12, wherein
the first restrictor overlaps the first actuator when viewed from the third direction.

14. The drive device according to claim 9, wherein
the center of the rotary shaft, the center of the coil, and the center of the magnetism detection element are aligned substantially linearly in the first direction.

15. An imaging device configured to shoot a subject, comprising:
an imaging element configured to convert an optical image of the subject into an image signal;
an imaging optical system including a lens facing the imaging element that receives the optical image of the subject through the imaging optical system;
the drive device, according to claim 9, being configured to drive the lens or the imaging element; and
a casing that houses the imaging element, the imaging optical system and the drive device.

* * * * *